United States Patent [19]

Coleman et al.

[11] 3,881,585
[45] May 6, 1975

[54] SELF LEVELLING CONVEYOR STOP
[75] Inventors: Bestor P. Coleman, Willow Springs; Kennedy McConnell, Riverdale, both of Ill.
[73] Assignee: Interlake, Inc., Chicago, Ill.
[22] Filed: Mar. 30, 1973
[21] Appl. No.: 346,571

[52] U.S. Cl.................. 193/35 A; 188/32; 188/62; 193/40
[51] Int. Cl...................... B65g 11/20; B65g 13/00
[58] Field of Search........ 188/32, 62, 111; 93/35 A, 93/40

[56] References Cited
UNITED STATES PATENTS

| 1,074,185 | 9/1913 | Lockwood | 188/62 X |
| 2,071,770 | 2/1937 | Shield | 193/40 |
| 2,117,026 | 5/1938 | Kennedy | 188/32 |
| 2,517,673 | 8/1950 | Johnson | 188/32 |
| 3,180,472 | 4/1965 | Isacsson | 193/40 X |
| 3,233,761 | 2/1966 | McCartney et al. | 188/32 X |
| 3,250,361 | 5/1966 | Bystedt | 193/35 A |
| 3,368,658 | 2/1968 | Eastham | 193/35 A |
| 3,532,201 | 10/1970 | McConnell | 193/35 A |
| 3,610,372 | 10/1971 | Warren | 193/35 A X |

Primary Examiner—Evon C. Blunk
Assistant Examiner—W. Scott Carson
Attorney, Agent, or Firm—Molinare, Allegretti, Newitt & Witcoff

[57] ABSTRACT

A self levelling stop member for arresting the movement of articles at the end of a conveyor includes a tiltable member pivotally mounted in the path of movement of the article and having a surface thereon which pivots between a first position in which the surface is positioned at an angle to the direction of movement of and in the path of the articles and a second position wherein the surface progressively and frictionally contacts the bottom of the articles to arrest their movement.

15 Claims, 2 Drawing Figures

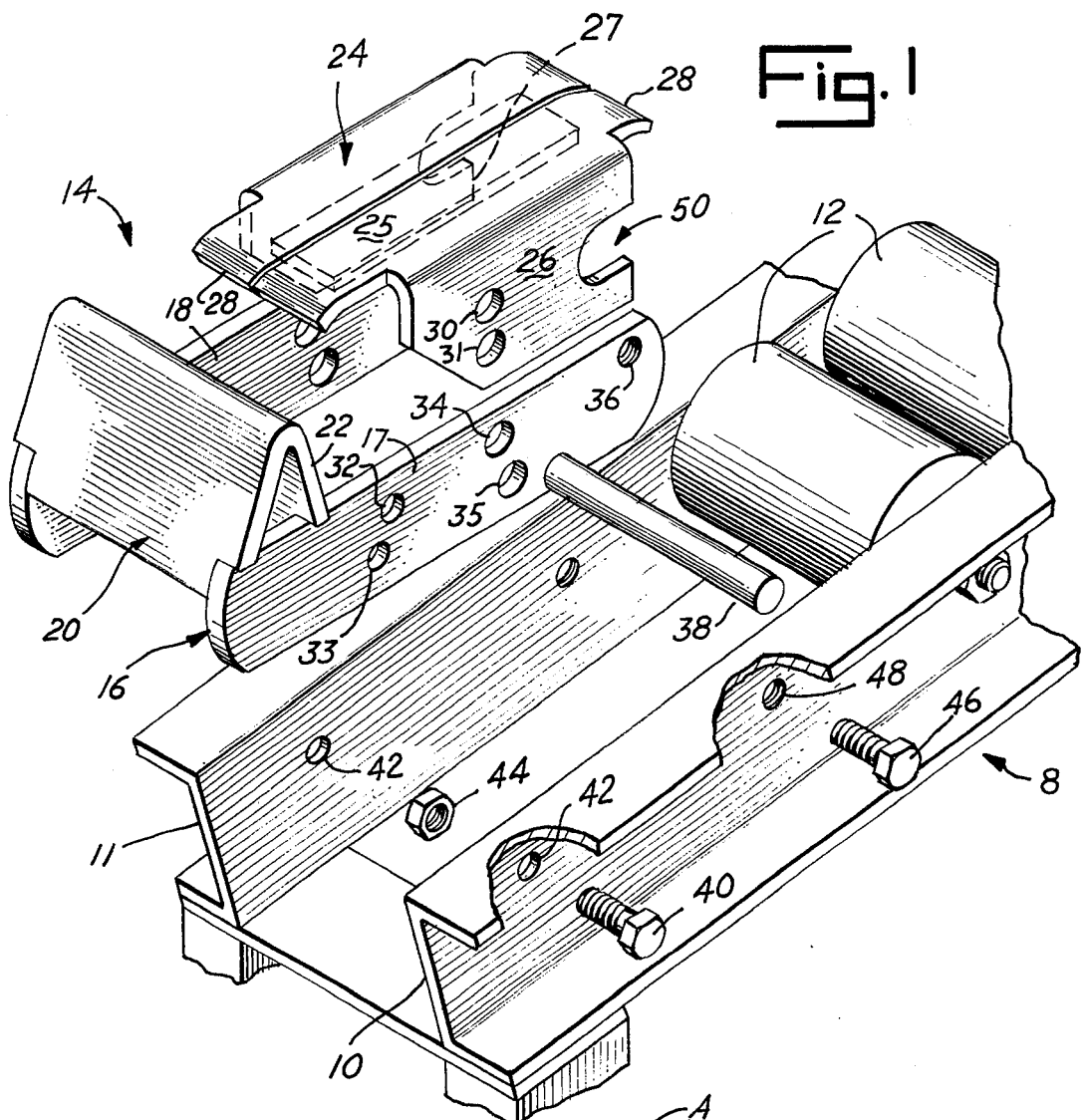
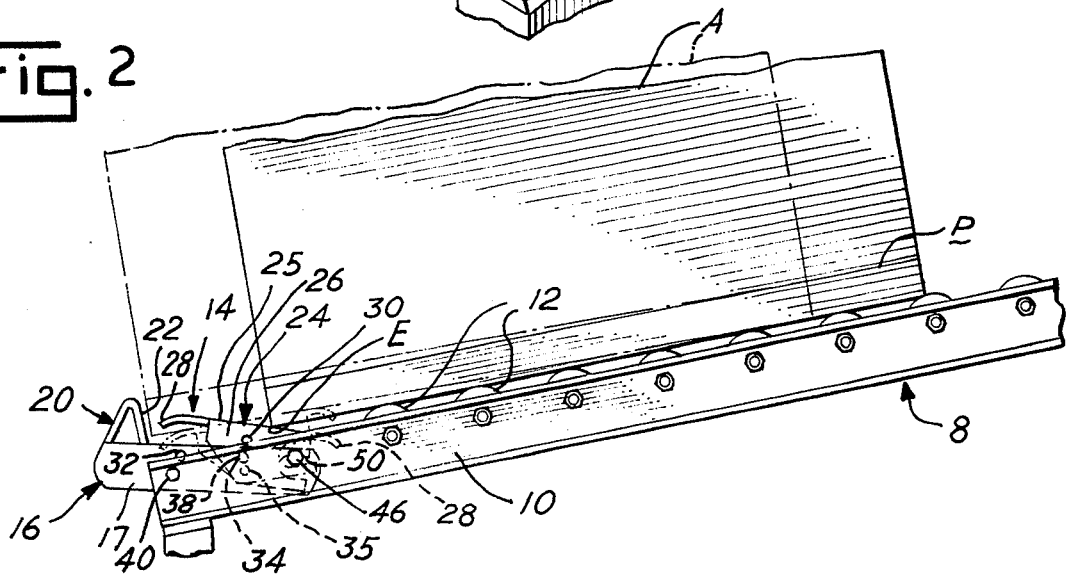

SELF LEVELLING CONVEYOR STOP

BACKGROUND AND SUMMARY OF THE INVENTION

This invention relates to a stop member and, more particularly, to a self levelling stop member for arresting the movement of articles on a conveyor.

In conveyors, for example, inclined roller conveyors, it is frequently necessary to provide some form of stop at the end of the conveyor to prevent the articles moving down the conveyor from falling off the end of the conveyor and to position the articles for removal from the conveyor. In the past simple stationary stops have been provided at the ends of conveyors in the path of movement of the article, such that as each article reaches the end of the conveyor it impactingly collides against the stop completely arresting the movement of the article. Such fixed stops must be of substantial construction in order to withstand the impact of the moving articles without damage or destruction of the stop, of the article or of the pallets upon which the articles are stacked, particularly where the articles are of substantial weight. Moreover, since the collision with such fixed stops at the end of the conveyor run is instantaneous, the high deceleration forces may result in damage to the articles or in derangement of plural articles which may be bound together or stacked on a pallet.

In order to overcome some of these disadvantages, end stops having reversely inclined stationary surfaces have been employed with some measure of success. In these end stops a fixed upwardly inclined surface is located in the path of travel of the article or of its pallet and just before the fixed vertical stop surface of the end stop, such that as the article reaches the end of the conveyor run, the leading edge of the article or of its pallet contacts, in line contact, the inclined surface and rides up the surface whereby the speed of the article is gravitationally decreased. Such reversely inclined stationary stops, although an improvement over the simple fixed end stops, also suffer several disadvantages. In the first instance, since the contact of the leading edge of the article or its pallet with the stationary inclined surface is line contact, extreme forces are brought to bear upon the inclined surface resulting in rapid wear of the surface. This is particularly the case where the articles conveyed by the conveyor are quite heavy, for example on the order of several tons. Moreover, such fixed inclined surfaces must generally be of substantial length in order to accommodate articles of excessive weights and adjustment of such stationary inclined construction to accommodate loads of differing weights is limited.

A stop member constructed in accordance with the principles of the present invention overcomes the several disadvantages of both the fixed stop and stationary inclined surface stop constructions. In the stop member incorporating the principles of the present invention, impact between the article and the fixed stop may not only be substantially reduced, but may be eliminated altogether, thereby avoiding damage to the fixed stop member, the articles or the pallets upon which the articles are carried and substantially reducing the possibility of failure of the stop member. In the stop member of the present invention, line contact and excessive wear is also avoided, thereby substantially reducing the need for replacement and the possibility of failure during use of the stop member. In the stop member incorporating the principles of the present invention, a tiltable surface is positioned in the path of the articles which, when contacted by the articles, tilts to progressively and frictionally contact the articles to slow the articles without exerting severe deceleration forces on the articles. In the stop member constructed in accordance with the principles of the invention, in addition to progressively and frictionally decelarating the article, the articles are elevated above the conveyor surface during the motion arresting operation, thereby increasing the drag on the articles to further assist in arresting movement of the articles. Finally, the stop member constructed in accordance with the principles of the invention may be readily and easily adjusted to accommodate wide ranges of varying weight and size articles.

In a principal aspect of the present invention, a stop member for arresting the movement of articles comprises a movable member having a surface thereon which is adapted to be engaged by the articles and which is mounted for movement in the path of movement of the articles. The movable member and its surface move between a first position in which the surface is disposed in the path of movement of the article and a second position when an article engages the surface wherein the movable member frictionally and progressively engages the articles to arrest the movement of the articles.

These and other objects, features and advantages of the present invention will be more clearly understood through a consideration of the following detailed description.

BRIEF DESCRIPTION OF THE DRAWING

In the course of this description, reference will frequently be made to the attached drawing in which:

FIG. 1 is an exploded isometric view of the end of a roller conveyor and a preferred embodiment of stop member constructed in accordance with the principles of the present invention; and FIG. 2 is a side elevation view of the conveyor and stop member of the present invention in the process of arresting the movement of an article which has reached the end of the conveyor.

DESCRIPTION OF THE PREFERRED EMBODIMENT

Referring to FIGS. 1 and 2, a conventional inclined roller conveyor 8 is shown comprising a pair of U-shaped side beams 10 and 11 spaced from each other so as to receive a plurality of rollers 12 therebetween which are positioned to contact the underside of an article A or its pallet P being conveyed on the conveyor. The rollers 12 may either be powered rollers or idler rollers, the latter being preferred. Although only one inclined line of rollers 12 is shown, it is contemplated that another identical inclined roller set be spaced transversely from the rollers shown by a distance substantially equal to the width of the articles A to be conveyed on the conveyor or of the width of the pallets P upon which the articles are stacked such that the two lines of rollers supportingly contact the underside of the article or pallet adjacent its two edges.

Referring now particularly to FIG. 1, the preferred embodiment of stop member 14 of the present invention is shown which is adapted to be mounted between the beams 10 and 11 of each line of inclined rollers and preferably at the lowermost end of each of the inclines.

The stop member 14 comprises a bracket member 16 having a pair of spaced legs 17 and 18 which are spaced apart by a distance approximately equal to the spacing distance between the insides of the beams 10 and 11. The distance between the legs 17 and 18 is fixed by a rigid, generally inverted V-shaped fixed stop member 20 which is welded between the ends of the legs as shown in FIG. 1. The face 22 of the rigid fixed stop member is positioned to act as a fixed stop surface, such that if the article A to be stopped is still moving at the time that its leading edge E reaches the face, movement of the article will be finally completely arrested.

A tiltable slide member 24 is insertable between the spaced legs 17 and 18. The tiltable slide member 24 comprises an upwardly facing flat surface 25 of substantial area and a pair of spaced downwardly depending flanges 26 and 27 adapted to fit between the legs 17 and 18. The ends 28 of the surface 25 are preferably bent downward to avoid impact with the leading edge of the moving articles A or pallet P as the articles or pallet arrive at the stop member 14.

One or more apertures 30 and 31 are drilled in each of the flanges 26 and 27 and a plurality of apertures 32, 33, 34, 35 and 36 are drilled in the legs 17 and 18. The tiltable slide member 24 is pivotally mounted to the bracket member by loosely inserting a pivot pin 38 through one of the apertures 34 or 35 in the legs 17 and 18 and one of the apertures 30 or 31 in the flanges 26 and 27. The apertures into which the pivot pin is inserted depend upon the angle which the surface is to assume which, in turn, depends upon the weight of the article the movement of which is to be arrested.

Once the bracket member 16 and tiltable slide member 24 have been pivotally mounted together by the pivot pin 38, the assembled stop member 14 is then positioned between the conveyor beams and a bolt 40 is inserted through an aperture 42 in each of the beams 10 and 11 and through one of the apertures 32 or 33 in the bracket legs 17 and 18. Whether bolt 40 is inserted through aperture 32 or 33 again depends upon the angle desired for the stop member. Either the apertures 42 may be threaded so as to receive the bolt 40 or the bolt may be secured in place by a suitable nut 44.

The assembled stop member 14 is also secured to the conveyor beams 10 and 11 by way of a bolt 46 which is inserted through aperture 48 and then threaded through aperture 36 in the bracket legs 17 and 18 so as to extend into the space between the legs and into an enlarged notch 50 in each of the slide member flanges 26 and 27. Thereby, bolt 46 not only secures the stop member assembly at the end of the conveyor and provides a fulcrum about which the angle of the stop member may be adjustably varied depending upon which aperture 32 or 33 the bolt 40 is inserted through, but also acts as a pivot limit stop to limit the pivotal movement of the tiltable slide member 24 in operation. The apertures 36, 48 and 32, 33 and 42 are located such that when the stop member assembly 14 is mounted between the beams 10 and 11, the beams block removal of the pivot pin 38.

The positioning of the apertures 30 and 31 relative to the center of gravity of the tiltable slide member 24 is such that when no load is exerted on the surface 25, the tiltable slide member will automatically tilt in a clockwise direction as viewed in FIGS. 1 and 2 by gravity, so as to present its maximum angle to the oncoming articles as shown in solid in FIG. 2. It will be appreciated that both the tiltable slide member 24 and the bracket member 16 are constructed of a sturdy material, such as fairly heavy gauge steel, where the articles to be stopped are of substantial weight.

Although it is believed that from the foregoing description the operation of the stop member of the present invention will be clear, a description of the operation is as follows.

A stop member 14 is mounted at the ends of and between the beams 10 and 11 of two or more of the roller inclines of the conveyor. Without a load on surface 25, the surface automatically rotates about pivot pin 38 to a first position in which the surface 25 is at an angle to the path of movement of the leading lower edge E of the article A or pallet P upon which the articles are stacked and in the path of movement of this edge. The degree of rotation is limited by the bolt 46 contacting the upper edge of notch 50. The desired angle may and should be varied depending upon the weight of the article the movement of which is to be arrested, the heavier the article the greater the angle and the earlier the contact of the leading edge E with the surface 24.

This angle of the surface 24 may be readily varied by varying the positioning of the pivot pin 38 in different ones of the apertures 30, 31 and 34, 35 and/or by varying the positioning of the bolt 40 in either the upper 32 or lower aperture 33. For example, in decreasing magnitude of article weights, the pivot pin 38 and bolt 40 may be placed in holes 34/33, 35/33, 34/32 and 35/32. Whether the pin 38 passes through apertures 34 or 35, the angle may still be further varied by passing the pin either through aperture 30 or 31. Preferably the angle of surface 25 should be adjusted such that the movement of the article at the end of the conveyor is arrested progressively and such that as leading edge E of the article A or pallet P arrives at the fixed stop face 22, the edge E should stop just short of contact with the face.

As an article of a given weight proceeds down the inclined rollers 12, its leading edge E will come into contact with the surface 25 as shown in solid in FIG. 2. As the leading edge E proceeds further down the incline toward the end stop 20, it will ride upward along the surface 25 and cause the tiltable slide member 24 to tilt in a counterclockwise direction as viewed in FIG. 2, such that the angle of surface 25 is decreased so as to move to a second position parallel to the underside of the pallet. Thereby, the entire area of the surface 25 will move into frictional contact with the underside of the pallet P to progressively arrest the movement of pallet and article as shown in the dot and dash lines in FIG. 2.

The stop member 14 is also mounted at the end of the conveyor such that when the tiltable slide member 24 has been rotated to its motion arresting position as shown in dot and dash in FIG. 2, the surface 25 is slightly above the plane of the tops of the rollers 12 of the conveyor. Thus, the leading edge E of pallet P will become slightly elevated above the last rollers to increase the motion arresting drag on the article A or pallet P. Finally, as shown in dot and dash in FIG. 2, the article will stop just short of the surface 22 of the fixed stop member 20, the latter of which has been provided as insurance to prevent the article from accidentally overshooting the tiltable member 24.

It will be understood that the embodiment of the present invention which has been described is merely illustrative of an application of the principles of the invention. Numerous modifications may be made by those skilled in the art without departing from the true spirit and scope of the invention.

What is claimed is:

1. A stop member for arresting the movement of an article on a conveyor comprising:

a movable arresting member having a substantially flat surface thereon of substantial area, said movable member adapted to be engaged by the article, mounting means for movably mounting said movable member in the path of movement of the article, said mounting means including pivot means pivotally mounting said movable member intermediate the length of its surface at a location spaced substantially from the ends thereof, said movable member and said surface being pivotally movable about said pivot means between a first position in which said surface is disposed at an angle to and in the path of movement of the article and a second position substantially simultaneously with engagement of the article with said surface, wherein substantially the entire flat area of said surface frictionally engages a portion of the article in said second position and elevates said portion above the path of movement of said portion before said portion engaged said surface, whereby the movement of the article is substantially arrested.

2. The stop member of claim 1 including pivot stop means for limiting the pivotal movement of said movable member substantially between said first and second positions.

3. The stop member of claim 1 including fixed stop means beyond said movable member in the path of movement of the articles.

4. The stop member of claim 1 including mounting means for mounting said movable member to a conveyor for conveying the articles.

5. The stop member of claim 1 including bracket means, said mounting means pivotally mounting said movable member to said bracket means.

6. The stop member of claim 5 wherein said bracket means includes fixed stop means beyond said movable member in the path of movement of the articles.

7. The stop member of claim 6 including mounting means for mounting said bracket means to a conveyor upon which the articles are being moved, at least one of said bracket mounting means and said pivotal mounting means comprising a plurality of spaced apertures for selectively changing said angle, and said bracket mounting means includes pivot stop means for limiting the pivotal movement of said movable member substantially between said first and second positions.

8. The stop member of claim 5 including mounting means for mounting said bracket means to a conveyor upon which the articles are being moved.

9. The stop member of claim 8 wherein at least one of said bracket mounting means and said pivotal mounting means comprises a plurality of spaced apertures for selectively changing the angle of the surface at said first position.

10. The stop member of claim 8 wherein said bracket mounting means includes pivot stop means for limiting the pivotal movement of said movable member substantially between said first and second positions.

11. The stop member of claim 1 wherein said movable member pivots between said first position in which said surface is disposed at an angle to the direction of movement of the articles and said second position in which said surface is disposed substantially parallel to the direction of movement of the articles.

12. The stop member of claim 1 wherein, when said movable member and surface are moved to said second position, the portion of the article frictionally engaging said flat area of said surface is elevated by and supported upon said flat area of said surface.

13. The stop member of claim 12 wherein said pivot means is positioned to bear substantially the entire weight of the portion of the article engaging said flat area of surface when said movable member and surface are moved to said second position.

14. The stop member of claim 1 wherein said mounting means mounts said movable member for automatic movement from said second position to said first position upon disengagement of the article and said surface.

15. The stop member of claim 14 wherein said automatic movement is gravitational.

* * * * *